US009535969B1

(12) United States Patent
Epstein et al.

(10) Patent No.: US 9,535,969 B1
(45) Date of Patent: Jan. 3, 2017

(54) CONFLICT-FREE TWO-WAY SYNCHRONIZATION FOR DISTRIBUTED VERSION CONTROL

(71) Applicant: GOOGLE INC., Mountain View, CA (US)

(72) Inventors: Michael James Boyer Epstein, Mountain View, CA (US); Abhishek Sheopory, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 326 days.

(21) Appl. No.: 14/457,803

(22) Filed: Aug. 12, 2014

(51) Int. Cl.
*G06F 17/30* (2006.01)

(52) U.S. Cl.
CPC ............................... *G06F 17/30575* (2013.01)

(58) Field of Classification Search
USPC ........ 707/609, 822, 827, 828, 823, 826, 831
See application file for complete search history.

(56) References Cited

U.S. PATENT DOCUMENTS

| | | | |
|---|---|---|---|
| 2004/0074978 A1* | 4/2004 | Rosen ..................... | G06Q 50/06 236/1 C |
| 2009/0164994 A1* | 6/2009 | Vasilevsky .......... | G06F 9/45533 718/1 |
| 2011/0040812 A1* | 2/2011 | Phillips ................ | G06F 9/45541 707/822 |
| 2011/0055299 A1* | 3/2011 | Phillips ................ | G06F 9/45533 707/827 |

* cited by examiner

*Primary Examiner* — Sana Al Hashemi
(74) *Attorney, Agent, or Firm* — Birch, Stewart, Kolasch & Birch, LLP (57) ABSTRACT

A system and method for conflict-free two-way synchronization between a primary repository and a secondary repository, which may be a mirror of the primary repository, are disclosed. An example method includes receiving a child revision associated with a parent revision in a secondary repository. The parent revision may be pointed to by a second user-visible reference in the secondary repository. The hidden reference to the child revision may be stored in a temporary storage area in the secondary repository that is hidden from view of user operations. A first user-visible reference in the primary repository that corresponds to the second user-visible reference in the secondary repository may be identified. This first-user-visible reference may point to a revision in the primary repository. Then, the revision to which the first user-visible reference in the primary repository points may be compared with the revision to which the second user-visible reference in the secondary repository points. If the revision to which the second user-visible reference points in the secondary repository is a copy of the revision to which the first user-visible reference points in the primary repository, the child revision may be pushed from the secondary repository to the primary repository so that the primary repository includes a copy of the child revision from the secondary repository. The first user-visible reference in the primary repository may be updated to point to the copy of the child revision in the primary repository.

18 Claims, 10 Drawing Sheets

CONFLICT-FREE TWO-WAY SYNCHRONIZATION FOR DISTRIBUTED VERSION CONTROL

BACKGROUND

In distributed version control systems, such as Git or Mercurial, a source code repository may exist on multiple client or server devices. Each device may contain a different form of the code repository, containing different versions of source code files than other client repositories. One repository may be a subset, a superset, or a mixture of both a subset and a superset, of another repository depending on the revisions that were made in the specific repository.

Repositories may diverge in many ways. New revisions may be added to one repository and not others, conflicting revisions may be added to separate repositories, and/or files may be deleted from repositories. The revisions in a repository can be viewed as a graph containing nodes (each node reflecting an entire file tree), linked by parent relationships, as well as a set of named references that each point to some node in the graph.

At some points in time, it may be necessary to synchronize the repositories. In some cases, synchronization may be simple. For example, a repository A may contain several revisions and a second repository B may contain no revisions. To synchronize these repositories, the revisions in repository A may be copied to repository B. After the synchronization operation, repositories A and B are identical.

However, it is often difficult to synchronize changes among repositories because there may be complicated and conflicting differences between the revisions in repository A and repository B. In order to handle these differences, a merging strategy may be defined as to how to synchronize the repositories. For example, a clobber strategy may be used that resolves any conflicts between A and B in favor of A. Another strategy may be to ask the user, requiring human intervention to resolve any conflicts interactively. A third strategy may be the "timid strategy" which aborts any synchronization operation that might cause a conflict.

One strategy that works without human-operator intervention is to perform only one-way synchronization. If all intentional user modifications happen in repository A, then it is trivial to set up repository B as a one-way mirror of repository A using repeated invocations of the clobber strategy discussed above. However, there are times when it is desirable to add a new revision to repository B and then push the revision to repository A, while retaining the ability to perform future one-way synchronizations from repository A to repository B without observing conflicts. When synchronizing repository A and B if both repositories have changed, there may be several potential conflicts that arise. One user may add a new revision, revision R, to repository B, necessitating updating a reference Ref to point to the revision R, and then synchronizing the revision R to repository A. However, during this process, another user may add revision R' to repository A and update reference Ref to point to R' before the synchronization from repository B to repository A can occur. Therefore, when synchronization occurs there may be a conflict between the references that requires human-operator intervention.

SUMMARY

This specification describes technologies relating to repository synchronization in general, and specifically to methods and systems for conflict-free two-way synchronization for distributed version control.

In general, one aspect of the subject matter described in this specification can be embodied in a system, method, and non-transitory medium for conflict-free two-way synchronization between a primary repository and a secondary repository, which is a mirror of the primary repository. An example system includes one or more processing devices and one or more storage devices storing instructions that, when executed by the one or more processing devices, cause the one or more processing devices to execute an example method.

An example method includes receiving a child revision associated with a parent revision in the secondary repository, the parent revision being pointed to by a second user-visible reference in the secondary repository; storing a hidden reference to the child revision in a temporary storage area in the secondary repository; identifying a first user-visible reference in the primary repository that corresponds to the second user-visible reference in the secondary repository and points to a revision in the primary repository; comparing the revision to which the first user-visible reference in the primary repository points with the revision to which the second user-visible reference in the secondary repository points; responsive to determining that the revision to which the second user-visible reference points in the secondary repository is a copy of the revision to which the first user-visible reference points in the primary repository, pushing the child revision from the secondary repository to the primary repository so that the primary repository includes a copy of the child revision from the secondary repository; and updating the first user-visible reference in the primary repository to point to the copy of the child revision in the primary repository.

These and other embodiments can optionally include one or more of the following features. One-way synchronization from the primary repository to the secondary repository may be periodic, manually triggered, or automatically triggered based on a notification from the primary repository that the primary repository has changed. Pushing the child revision from the secondary repository to the primary repository may occur manually or by explicit user action. Responsive to determining that the revision to which the second user-visible reference points in the secondary repository is not a copy of the revision to which the first user-visible reference points in the primary repository, updating the secondary repository to include changes in the primary repository; and retrying the comparison after updating the secondary repository. After updating the secondary repository to include changes in the primary repository, merging updates to the parent revision with the child revision with the child revision in the secondary repository to create an updated child revision prior to pushing the child revision from the secondary repository to the primary repository so that the primary repository includes a copy of the updated child revision from the secondary repository. The temporary storage area for the hidden reference may be removed once the push operation has successfully executed. The second user-visible reference in the secondary repository may be pre-applied to point to the child revision before a synchronization from the primary repository to the secondary repository. The push operation may occur by an automated process. During synchronization from the primary repository to the secondary repository, no operation may be performed in the secondary repository when the second user-visible reference was pre-applied to point to the child revision before the synchronization from the primary repository to the secondary repository.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

DETAILED DESCRIPTION

According to an example embodiment, potential conflicts may be avoided when synchronizing a first repository (repository A) with a second repository (repository B) by using a temporary holding area to store updates to the second repository (repository B). Therefore, local editing of an otherwise read-only, mirror repository may be permitted while maintaining desirable properties such as freedom from synchronization conflicts and not requiring re-copying of data that is already stored local to the second repository to be part of the synchronization process between the first repository and the second repository.

Figure 1:
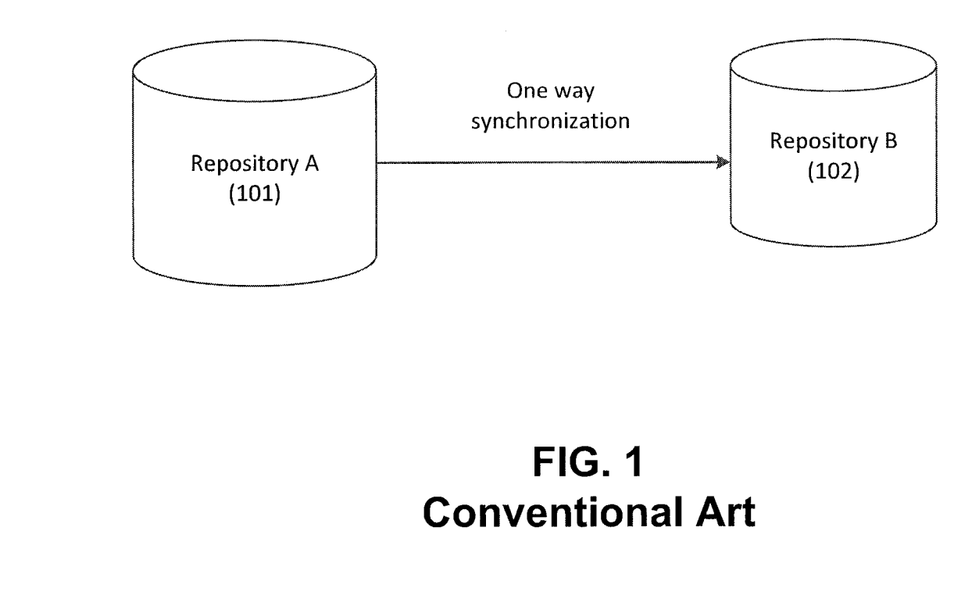
FIG. 1 is a block diagram illustrating conventional one-way synchronization.

In an example embodiment, one-way synchronization may be performed the majority of the time from a first repository (101) to a second repository (102) as shown in FIG. 1. Therefore, the second repository can be referred to as a read-only mirror of the first repository. Synchronizations from the first repository to the second repository may be periodic, manually triggered, or automatically triggered based on notifications from the first repository that the repository has changed.

Figure 2:
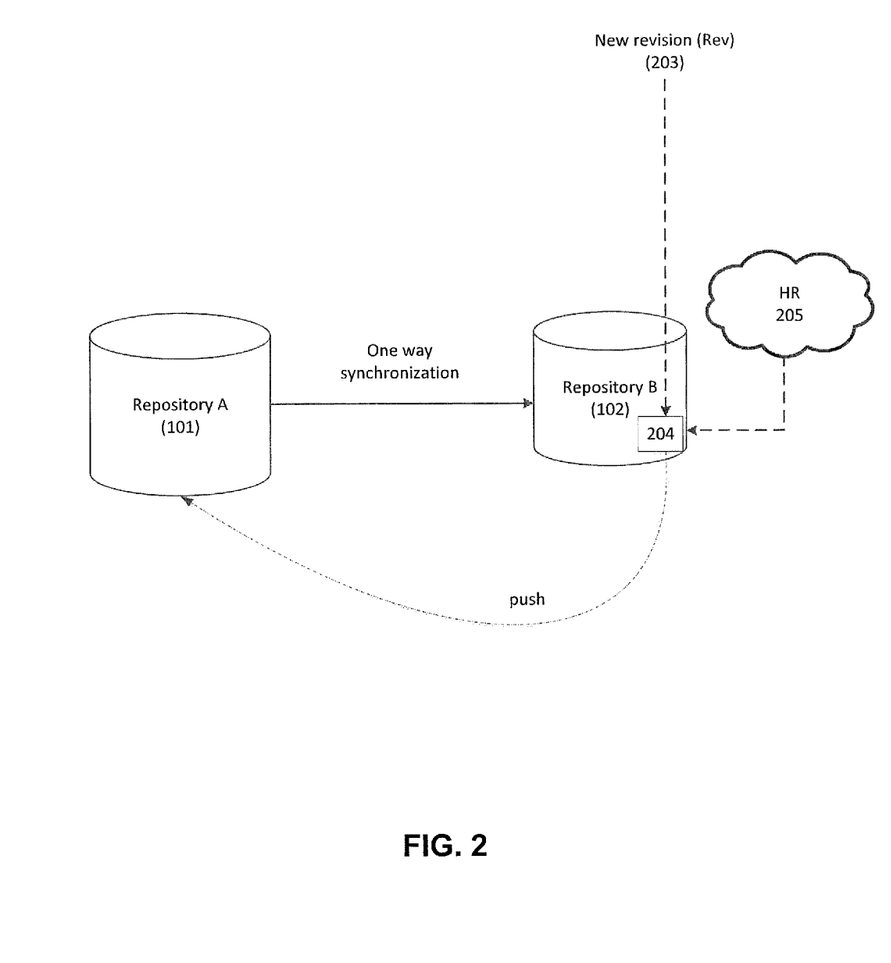
FIG. 2 is a block diagram illustrating an example of conflict-free two-way synchronization for distributed version control.

However, it may occasionally be desirable to add a new revision to the second repository and push the revision from the second repository (102) to the first repository (101). For example, repository B may be stored on a local client device and repository A may be stored on a remote device. As illustrated in FIG. 2, a revision, Rev, may be made locally (203) and then pushed to the remote repository. In some embodiments, pushes may occur manually by explicit user action. In other embodiments, pushes may occur by an automated process. Although pushes may be allowed from the second repository to the first repository, an example embodiment should still retain the ability to perform future one-way synchronization from the first repository to the second repository without observing conflicts.

An example embodiment allows for such synchronization by storing new revisions from a second repository in a temporary holding area, which may be a hidden reference or branch. This temporary holding area may be in a separate area within the second repository as illustrated in FIG. 2 (204). Alternatively or additionally, the temporary holding area may store the file revisions in the same area as the rest of the revisions in the second repository, but may ensure that any named references to those file revisions are stored separately, which may use a hidden reference or branch.

A compare-and-push operation may be used during a push synchronization from repository B to repository A. The compare-and-push operation may push revisions from the repository B's temporary holding area, which may be hidden, to a user-visible reference in repository A. If the reference in repository A, which in repository B refers to a new revision, has also moved in repository A since the last synchronization between the repositories, the synchronization operation may fail and no change may occur in repository A. A user may be given the option to update the revision in the second repository to account for the changes in the first repository (perhaps using a "merge" or "re-base" operation) and then try the compare and push operation again. Otherwise, repository A may incorporate the revision pointed to by the temporary holding area by updating the reference in repository A to point to the revision.

Figure 3:
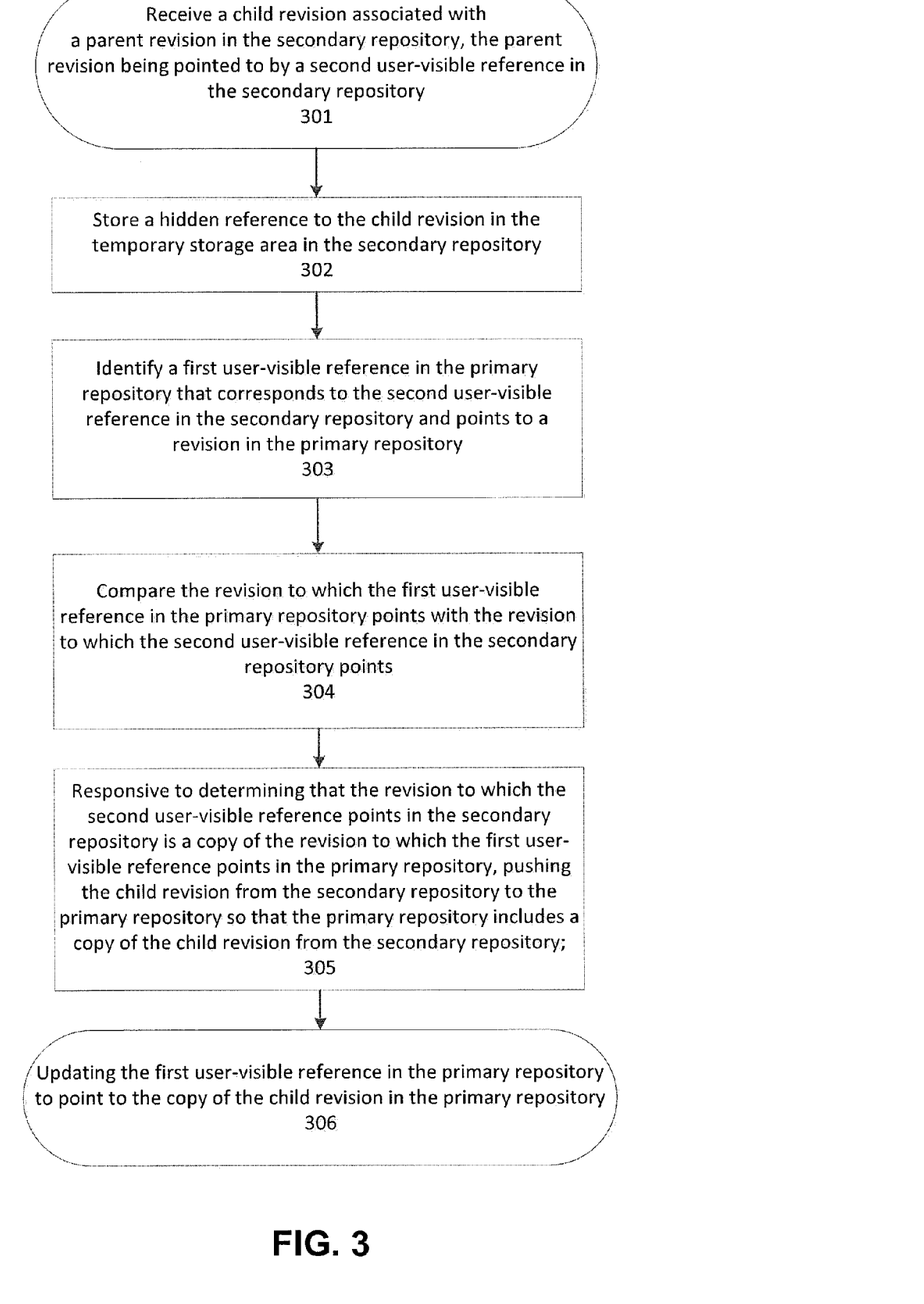
FIG. 3 is a flow diagram of an example method for conflict-free two-way synchronization.
Figure 4:
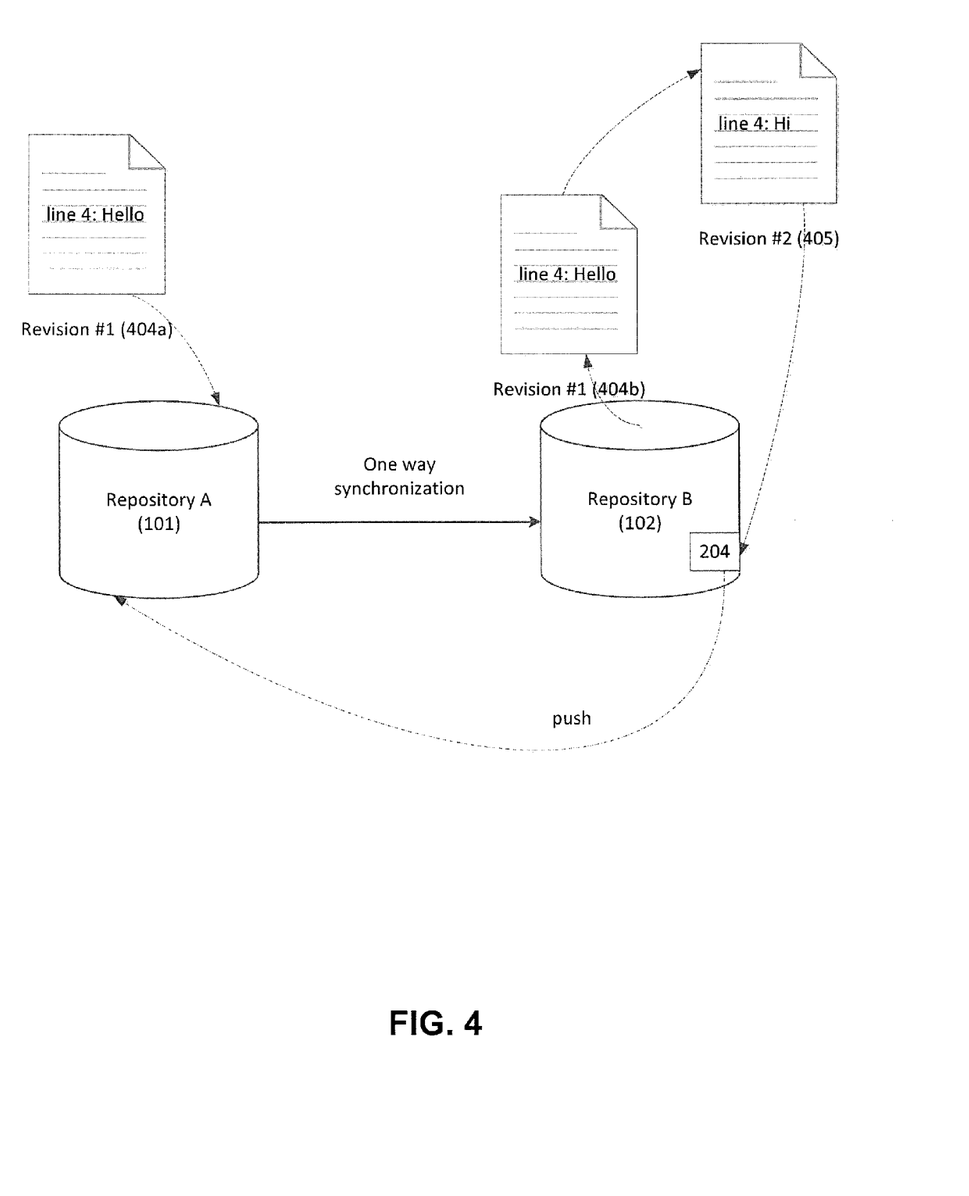
FIG. 4 is a block diagram illustrating an example of conflict-free two-way synchronization.

An example method begins with receiving a child revision, Rev, in a second repository (repository B, which may be a read-only mirror repository and may be considered a secondary repository as illustrated in FIG. 3 (301)) that is associated with a parent revision in the secondary repository. The parent revision may be pointed to by a second user-visible reference in the secondary repository. An example method may then point a temporary and/or hidden reference, HR (205), at repository B for referencing the child revision. This hidden reference (205) may be stored in a temporary storage area in the secondary repository (302). A first user-visible reference may be identified in the primary repository that corresponds to the second user-visible reference in the secondary repository and points to a revision in the primary repository (303). Since all revisions in the second repository have come from the first repository, the child revision, Rev, may be a child revision of a parent revision that exists both in the primary (first repository) repository and the secondary repository. The first repository's revision may be the parent or some other ancestor of the child revision, Rev. A compare-and-push operation may then be performed to compare the revision to which the first user-visible reference in the primary repository points with the revision to which the second user-visible reference in the secondary repository points (304). If the revision to which the second user-visible reference points in the secondary repository is a copy of the revision to which the first user-visible reference points in the primary repository (i.e. the contents of the two revisions match or are the same), the child revision from the secondary repository may be pushed to the primary repository so that the primary repository includes a copy of the child revision from the secondary repository (305). The first user-visible reference in the primary repository may then be updated to point to the copy of the child revision in the primary repository (306). For example as shown in FIG. 4, a file revision, Revision #1 (404a), may be synchronized between Repository A (101) and Repository B (102). Therefore, Repository B contains a copy of this revision as Revision #1 (404b). Changes may be made to the revision in Repository B as illustrated by Revision #2 (405) that create a new child of Revision #1 (404b). This new child revision (405) in Repository B (102) may be referenced from the temporary and/or hidden reference (204). It is also possible that the new revision already exists in the second repository, B, perhaps because the same editing operation already happened in Repository A. If so, only a reference operation may be necessary in the second repository to create a link between the new reference (204) in Repository B (102) and the new revision (405) in Repository B (102).

The parent or another ancestor of the revision Rev may be a revision, Rev_A, to which reference R pointed in repositories A and B at the completion time of the last synchronization from repository A to repository B. A compare-and-push operation may be executed from repository B to repository A. If the compare-and-push operation succeeds, reference R in repository A may point to the new revision Rev. If the operation fails, the operation may be aborted. The operation may be executed again after updating the revision Rev in repository B to account for modifications of Rev_A in repository A. At any point in this process, it may be safe for a manual or automatic synchronization operation to occur from repository A to repository B. Once the compare-and-push has been successfully executed, the temporary or hidden reference, HR, may be removed.

Figure 5:
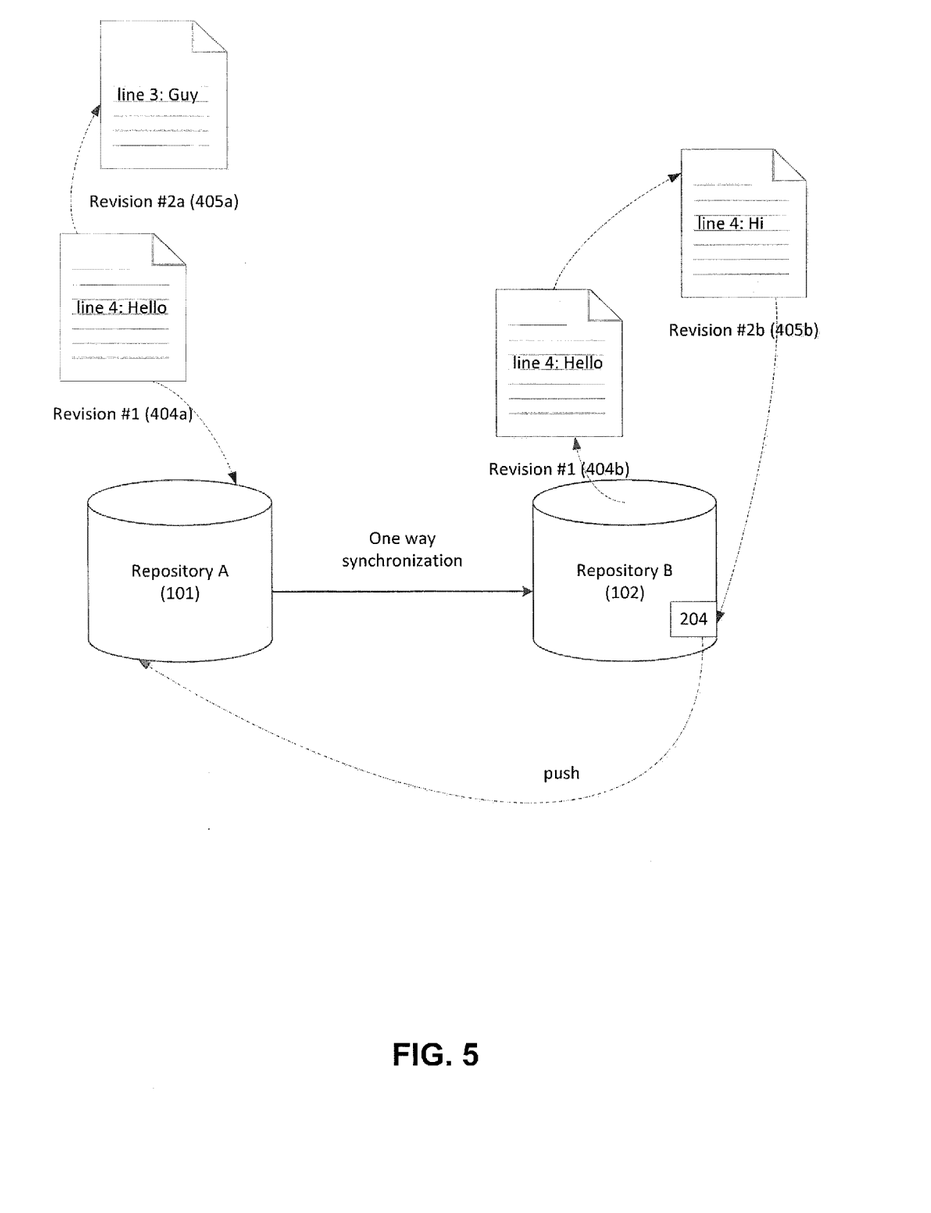
FIG. 5 is a block diagram illustrating an example of conflict handling for two-way synchronization.

As discussed above, the compare-and-push operation may fail if the ancestor reference in the primary repository has moved since the last synchronization from the primary repository to the secondary repository. For example, as shown in FIG. 5, a file revision, Revision #1 (404a), may be synchronized between Repository A (101) and Repository B (102). This process is similar to what is illustrated in FIG. 4. However, in FIG. 5, Revision #1 (404a) from the primary repository and Revision #1 (404b) from the secondary repository may both be updated in this example, producing Revisions #2a (405a) and 2b (405b) respectively. The revision (404a) in Repository A (101), to which the visible revision (404b) in Repository B (102) corresponds, may have a new child revision added to it, Revision #2a (405a), and the reference which previously pointed to revision (404a) may be updated to point to this new child revision (405a). A comparison between the visible revision (404b) in Repository B (102) and the current revision (405a) in Repository A (101) would show that the revisions are not the same. Thus, a compare-and-push operation from Repository B (102) to Repository A (101) to push Revision #2b (405b) to Repository A (101) may fail since the compare-and-push operation succeeds when the visible revision in Repository B (102) is the same as the current revision in Repository A (101). Since the operation fails, no change may occur in Repository A (101).

Figure 6A:
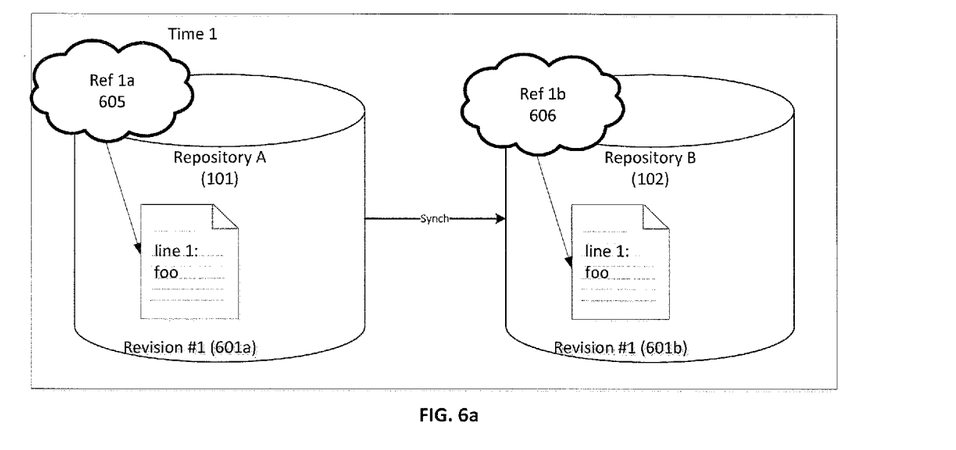
FIG. 6a illustrates an example two-way synchronization process at time 1 when two repositories contain the same revisions.
Figure 6B:
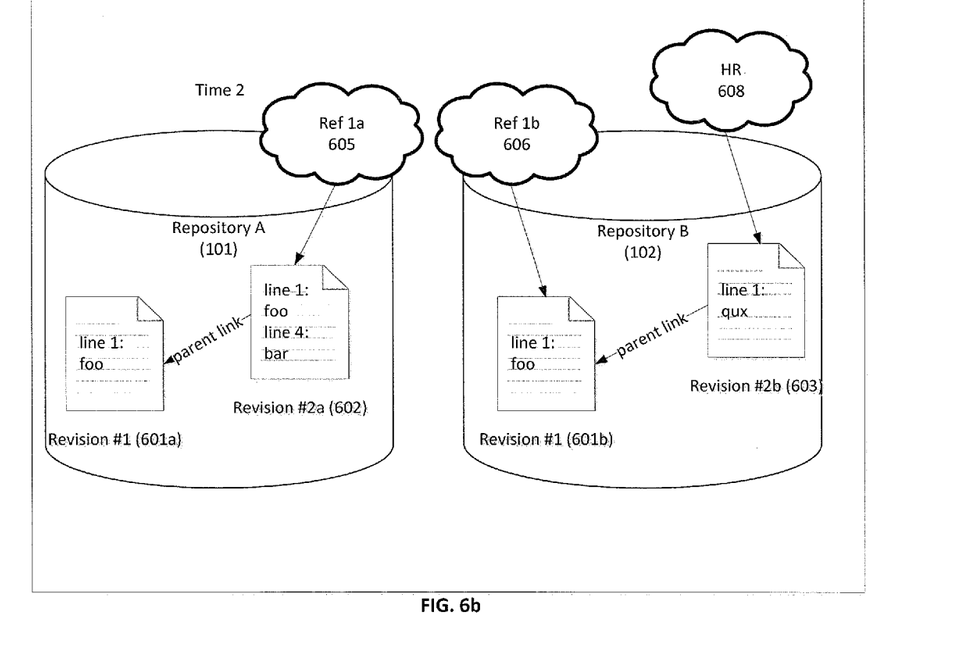
FIG. 6b illustrates an example two-way synchronization process at time 2 when both repositories have been modified.
Figure 6C:
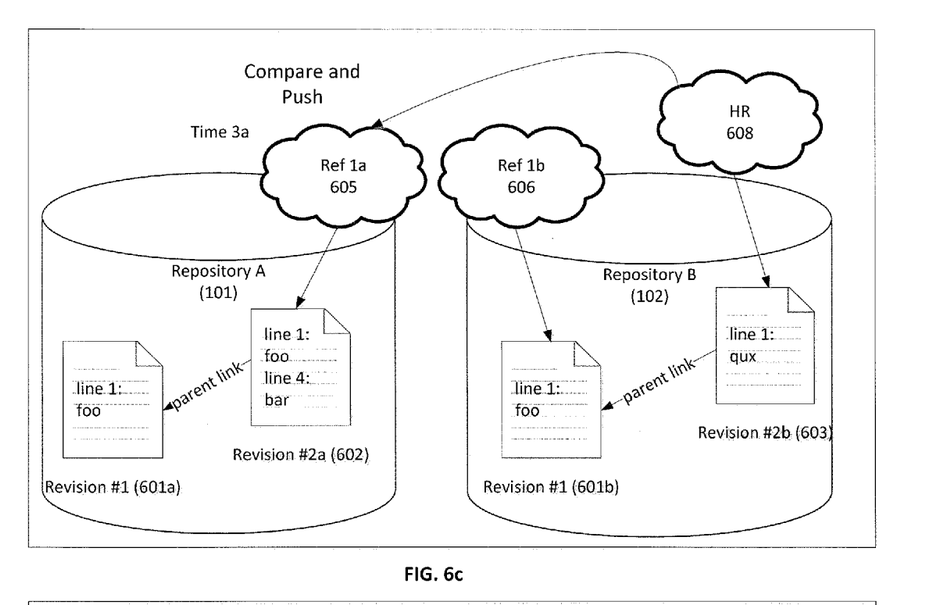
FIG. 6c illustrates an example two-way synchronization process at time 3a when a compare and push operation occurs between the two repositories.

FIGS. 6a-6g further illustrate the example two-way synchronization process. As illustrated in FIG. 6a, at time 1, Repository A may contain Revision #1 (601a), referenced by Ref. 1a (605). Repository B (102) may contain a copy of Revision #1 (601b), referenced by Ref. 1b (606). At time 2 as illustrated in FIG. 6b, a child revision, Revision #2a (602), may be created with Revision #1 (601a) as its parent in Repository A (101). Reference 1a (605) may be updated to point to this new revision. A child revision, Revision #2b (603), may be created in Repository B (102) with Revision #1 (601b) as its parent. A hidden reference (608) may be created to point to Revision #2b (603). In order to add Revision #2b (603) to Repository A (101), there may be a compare-and-push operation that occurs to determine whether Ref 1a (605) and Ref 1b (606) point to the same revision as illustrated in FIG. 6c. When the references point to the same revision, the compare and push operation may exchange the current revision in Repository A (101) pointed to by Ref 1a (605) with the revision pointed to by the hidden reference (608). In this example, Ref 1a (605) and Ref 1b (605) do not point to the same revision. Therefore, the revision, Revision #2b (603) pointed to by the hidden reference (608) may not be pushed to Repository A (101).

Figure 6D:
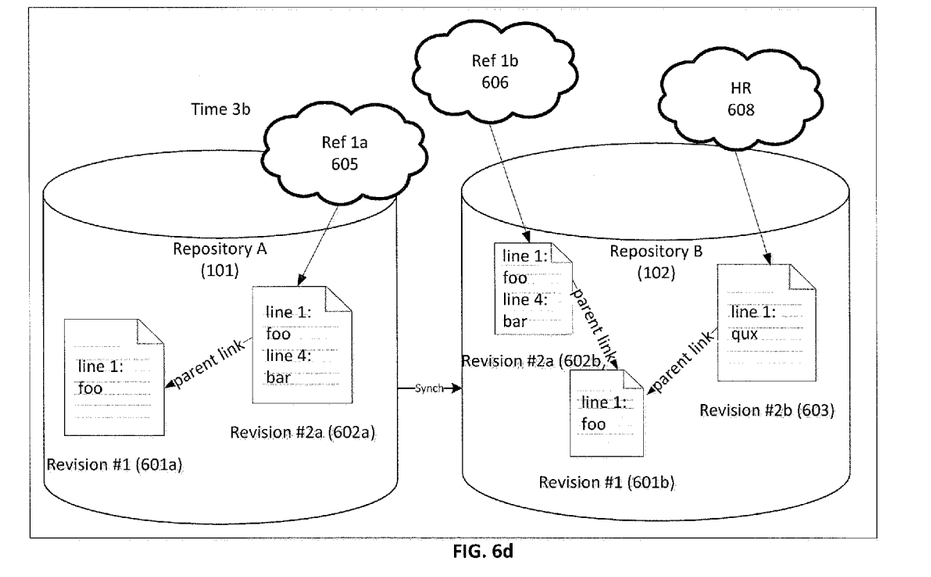
FIG. 6d illustrates an example two-way synchronization process at time 3b when a synchronization occurs from the primary repository to the secondary repository.
Figure 6E:
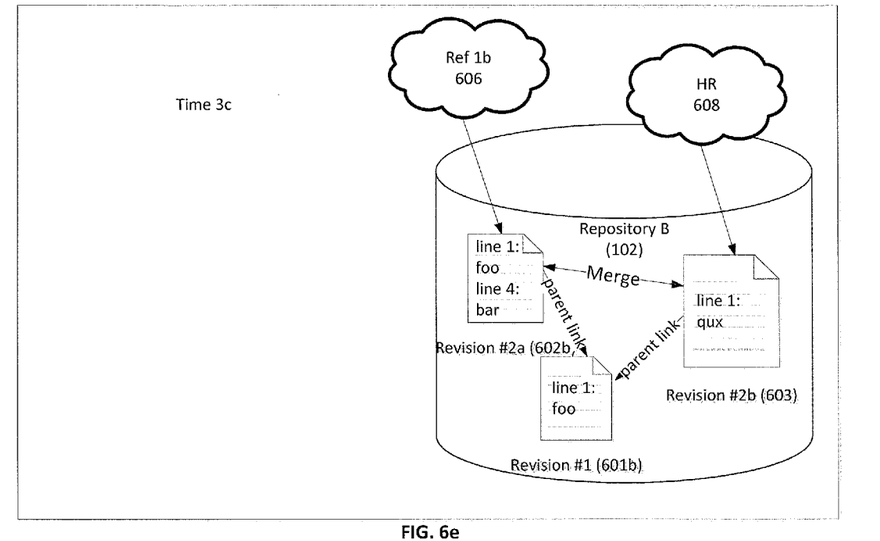
FIG. 6e illustrates an example two-way synchronization process at time 3c when changes in a first repository are merged with changes in a second repository.
Figure 6F:
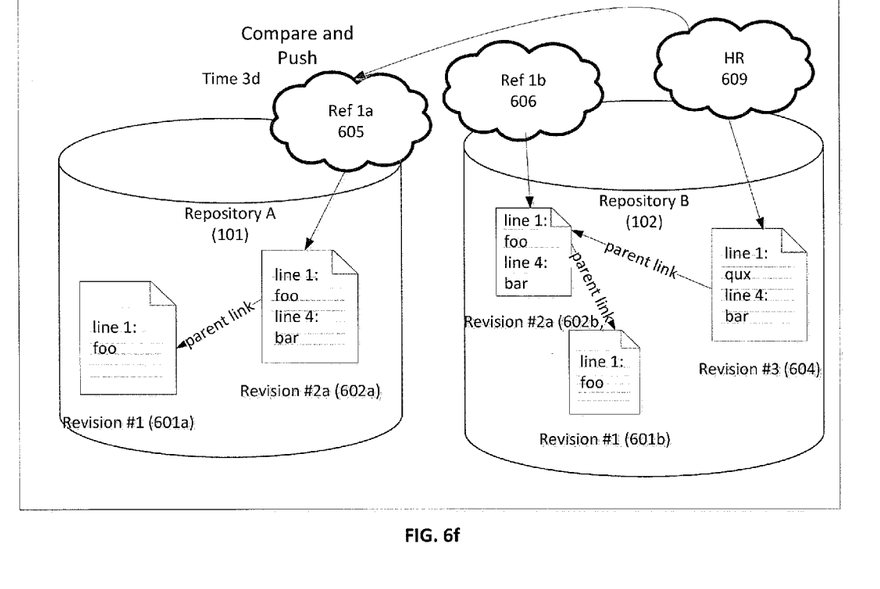
FIG. 6f illustrates an example two-way synchronization process at time 3d when a compare and push operation occurs between the two repositories.
Figure 6G:
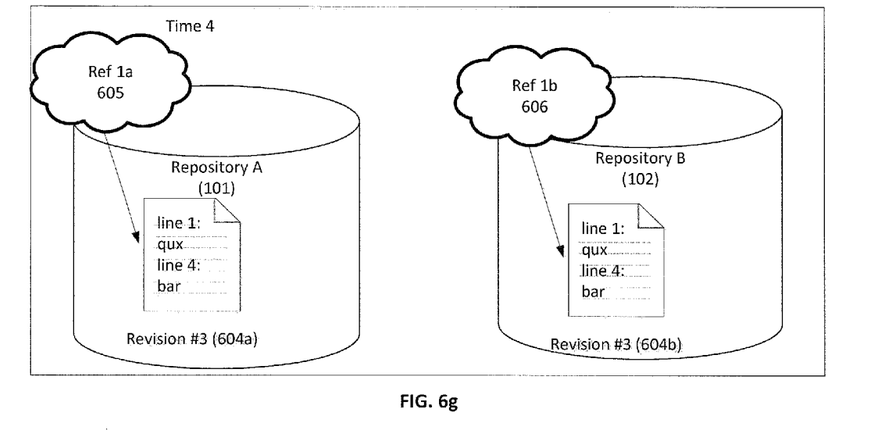
FIG. 6g illustrates an example two-way synchronization process at time 4 when a revision is pushed from the second repository to the first repository and a reference in the first repository is updated to point to the pushed revision.

Instead, there may be a synchronization operation that occurs between Repository A (101) and Repository B (102) in order to push Revision #2a (602) to Repository B (102) as illustrated in FIG. 6d. After the synchronization, Ref 1a (605) and Ref 1b (606) both point to the same revision, Revision #2a (602a, 602b). Revision #2b (603) should then be merged with Revision #2a (602b) in Repository B (102) in order to incorporate the changes from Repository A (101) with the changes pointed to by the hidden reference (608) in Repository B (102) into one revision as illustrated in FIG. 6e. As shown in FIG. 6f, this process may create a new revision, Revision #3 (604), whose parent, Revision #2a (602b), is in both repositories. Revision #3 (603) may be referenced by a hidden reference (609). A compare-and-push operation may then occur. This operation may determine whether Ref. 1a (605) still points to Revision 2a (602a), as expected given the local knowledge from Ref. 1b (606), which points to Revision 2a (602b). In this example, both references (605, 606) point to Revision #2a (602a, 602b). Therefore, Revision #3 (604) may be pushed to Repository A (101) and Ref. 1a (605) may be updated to point to Revision #3 (604a) as illustrated in FIG. 6g. Although in FIG. 6g Repository A (101) and Repository B (102) are shown with only Revision #3 (604a, 604b), Revisions #1 and #2a would still exist in both repositories.

In some embodiments, once the compare-and-push operation succeeds, an example method may immediately pre-apply the update to the visible reference in the second repository to point to the child revision that was previously referenced from the hidden and/or temporary storage area, since it is known that the first repository has been successfully updated (including its user-visible reference) to include the new revision from the second repository. For example, as illustrated in FIG. 6g, Ref 1b (606) may be pre-applied to point to Revision #3 (604b) in Repository B (102) without waiting for a synchronization operation from Repository A (101) to Repository B (102). The subsequent synchronization from the first repository to the second repository may then become a no-operation for this revision. This optimization may permit faster confirmation that a human edit operation to the second repository as backed by the first repository has succeeded, without waiting for a synchronization from the first repository to the second repository.

Figure 7:
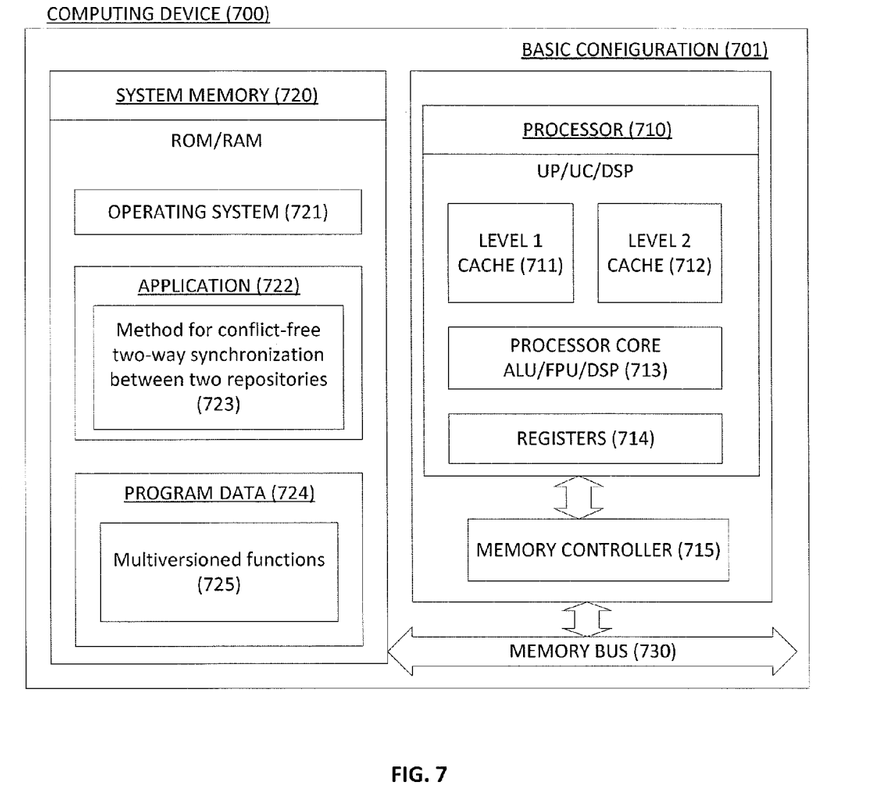
FIG. 7 is a block diagram illustrating an exemplary computing device.

FIG. 7 is a high-level block diagram of an example computer (700) that is arranged for conflict-free two-way synchronization between two repositories. In a very basic configuration (701), the computing device (700) typically includes one or more processors (710) and system memory (720). A memory bus (730) can be used for communicating between the processor (710) and the system memory (720).

Depending on the desired configuration, the processor (710) can be of any type including but not limited to a microprocessor (µP), a microcontroller (µC), a digital signal processor (DSP), or any combination thereof. The processor (710) can include one more levels of caching, such as a level one cache (711) and a level two cache (712), a processor core (713), and registers (714). The processor core (713) can include an arithmetic logic unit (ALU), a floating point unit (FPU), a digital signal processing core (DSP Core), or any combination thereof. A memory controller (716) can also be used with the processor (710), or in some implementations the memory controller (715) can be an internal part of the processor (710).

Depending on the desired configuration, the system memory (720) can be of any type including but not limited to volatile memory (such as RAM), non-volatile memory (such as ROM, flash memory, etc.) or any combination thereof. System memory (720) typically includes an operating system (721), one or more applications (722), and program data (724). The application (722) may include a method for conflict-free two-way synchronization between a first repository and a second repository. Program Data (724) includes storing instructions that, when executed by the one or more processing devices, implement a system and method for conflict-free two-way synchronization between repositories. (723). In some embodiments, the application (722) can be arranged to operate with program data (724) on an operating system (721).

The computing device (700) can have additional features or functionality, and additional interfaces to facilitate communications between the basic configuration (701) and any required devices and interfaces.

System memory (720) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of the device (700).

The computing device (700) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that include any of the above functions. The computing device (700) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for conflict-free two-way synchronization between a primary repository and a secondary repository the method comprising:

receiving a child revision associated with a parent revision in the secondary repository, the parent revision being pointed to by a second user-visible reference in the secondary repository;

storing a hidden reference to the child revision in a temporary storage area in the secondary repository;

identifying a first user-visible reference in the primary repository that corresponds to the second user-visible reference in the secondary repository and points to a revision in the primary repository;

comparing the revision to which the first user-visible reference in the primary repository points with the revision to which the second user-visible reference in the secondary repository points;

responsive to determining that the revision to which the second user-visible reference points in the secondary repository is a copy of the revision to which the first user-visible reference points in the primary repository, pushing the child revision from the secondary repository to the primary repository so that the primary repository includes a copy of the child revision from the secondary repository; and updating the first user-visible reference in the primary repository to point to the copy of the child revision in the primary repository.

2. The computer-implemented method of claim 1, further comprising:

one-way synchronization from the primary repository to the secondary repository that is periodic, manually triggered, or automatically triggered based on a notification from the primary repository that the primary repository has changed.

3. The computer-implemented method of claim 1, wherein pushing the child revision from the secondary repository to the primary repository occurs manually by explicit user action.

4. The computer-implemented method of claim 1, further comprising:

responsive to determining that the revision to which the second user-visible reference points in the secondary repository is not a copy of the revision to which the first user-visible reference points in the primary repository, updating the secondary repository to include changes in the primary repository; and retrying the comparison after updating the secondary repository.

5. The computer-implemented method of claim 4, further comprising:

after updating the secondary repository to include changes in the primary repository, merging updates to the parent revision with the child revision in the secondary repository to create an updated child revision prior to pushing the child revision from the secondary repository to the primary repository so that the primary repository includes a copy of the updated child revision from the secondary repository.

6. The computer-implemented method of claim 1, further comprising:

removing the temporary storage area for the hidden reference once the push operation has successfully executed.

7. The computer-implemented method of claim 1, further comprising:

pre-applying the second user-visible reference in the secondary repository to point to the child revision before a synchronization from the primary repository to the secondary repository.

8. The computer-implemented method of claim 1, wherein the push operation occurs by an automated process.

9. The computer-implemented method of claim 7, further comprising:

during synchronization from the primary repository to the secondary repository, performing no operation in the secondary repository when the second user-visible reference was pre-applied to point to the child revision before the synchronization from the primary repository to the secondary repository.

10. A system for conflict-free two-way synchronization between a primary repository and a secondary repository the system comprising:

one or more processing devices; and one or more storage devices storing instructions that, when executed by the one or more processing devices, cause the one or more processing devices to:

receive a child revision associated with a parent revision in the secondary repository, the parent revision being pointed to by a second user-visible reference in the secondary repository;

store a hidden reference to the child revision in a temporary storage area in the secondary repository;

identify a first user-visible reference in the primary repository that corresponds to the second user-visible reference in the secondary repository and points to a revision in the primary repository;

compare the revision to which the first user-visible reference in the primary repository points with the revision to which the second user-visible reference in the secondary repository points;

responsive to determining that the revision to which the second user-visible reference points in the secondary repository is a copy of the revision to which the first user-visible reference points in the primary repository, push the child revision from the secondary repository to the primary repository so that the primary repository includes a copy of the child revision from the secondary repository; and update the first user-visible reference in the primary repository to point to the copy of the child revision in the primary repository.

11. The system of claim 10, further comprising:

one-way synchronization from the primary repository to the secondary repository that is periodic, manually triggered, or automatically triggered based on a notification from the primary repository that the primary repository has changed.

12. The system of claim 10, wherein pushing the child revision from the secondary repository to the primary repository occurs manually by explicit user action.

13. The system of claim 10, further comprising:

responsive to determining that the revision to which the second user-visible reference points in the secondary repository is not a copy of the revision to which the first user-visible reference points in the primary repository, updating the secondary repository to include changes to the primary repository; and retrying the comparison after updating the secondary repository.

14. The system of claim 13, further comprising:

after updating the secondary repository to include changes in the primary repository, merging updates to the parent revision with the child revision in the secondary repository to create an updated child revision prior to pushing the child revision from the secondary repository to the primary repository so that the primary repository includes a copy of the updated child revision from the secondary repository.

15. The system of claim 10, further comprising:

removing the temporary storage area for the new revision once the push operation has successfully executed.

16. The system of claim 10, further comprising:

pre-applying the second user-visible reference in the secondary repository to point to the child revision before a synchronization from the primary repository to the secondary repository.

17. The system of claim 10, wherein the push operation occurs by an automated process.

18. The system of claim 16, further comprising:

during synchronization from the primary repository to the secondary repository, performing no operation in the secondary repository when the second user-visible reference was pre-applied to point to the child revision before the synchronization from the primary repository to the secondary repository.

* * * * *